May 14, 1968 W. L. JEWETT 3,383,490
WELDING MACHINE

Filed Feb. 18, 1965 4 Sheets-Sheet 1

INVENTOR
WALTER L. JEWETT
BY *[signature]*
ATTORNEY

May 14, 1968  W. L. JEWETT  3,383,490

WELDING MACHINE

Filed Feb. 18, 1965  4 Sheets-Sheet 3

INVENTOR
WALTER L. JEWETT

BY
ATTORNEY

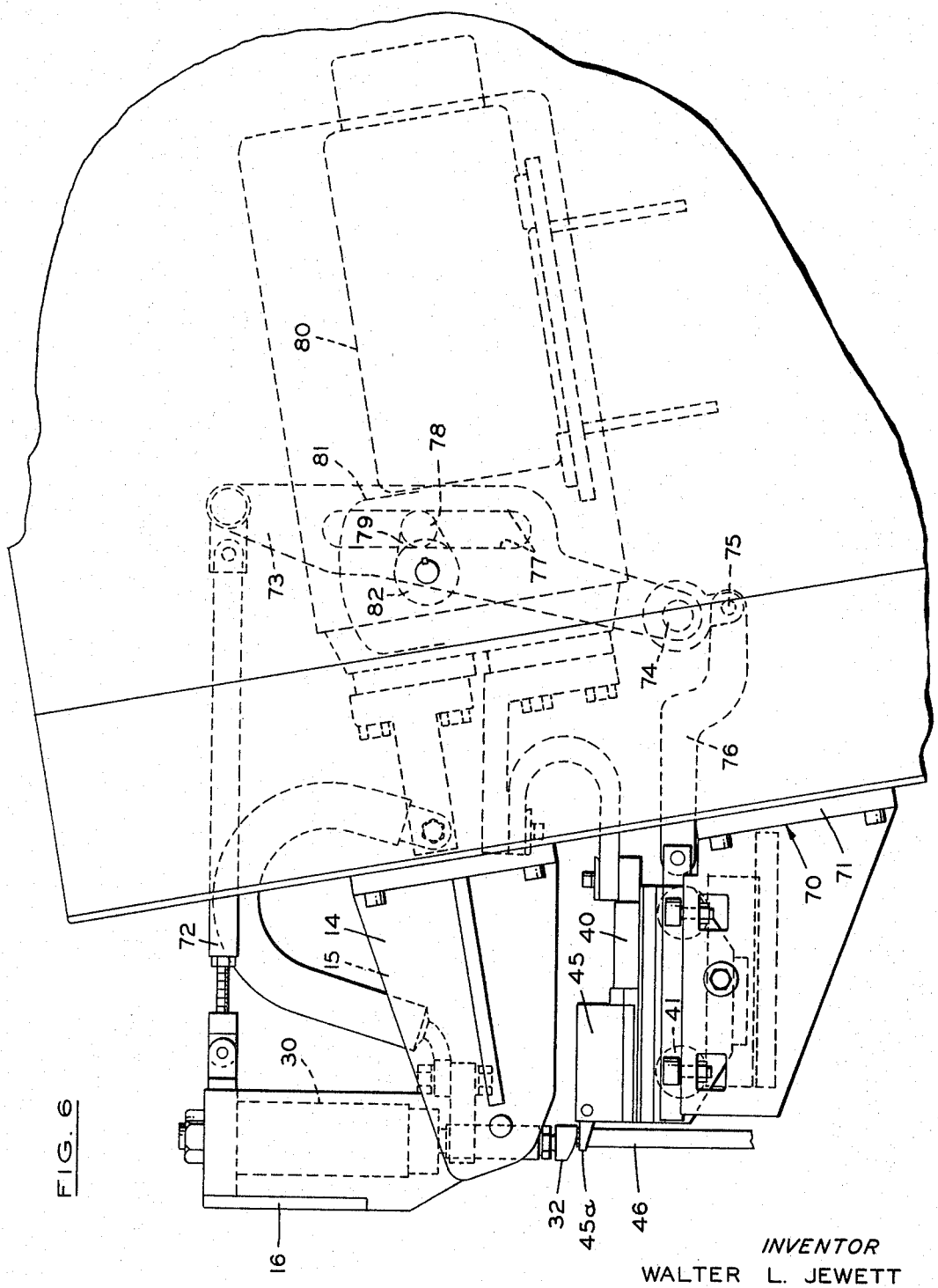

_United States Patent Office_

3,383,490
Patented May 14, 1968

3,383,490
WELDING MACHINE
Walter L. Jewett, Royal Oak, Mich., assignor to Allied Welder Corporation, Detroit, Mich., a corporation of Michigan
Filed Feb. 18, 1965, Ser. No. 433,750
4 Claims. (Cl. 219—87)

This invention relates to welding and in particular to machine means and a process for making a plurality of spot welds in a workpiece with a pair of electrodes in a single operation with the welds overlapped to form a continuous seam weld or spaced from one another to form an interrupted seam weld as desired.

In spot welding, two pieces of material together, they are overlapped. Opposed electrodes or "welding tips" are forced into engagement with the workpieces in the location of the overlapping portions of the workpieces. The forced engagement of the opposed electrodes makes a point of electrical contact between the electrodes through the workpieces. This also makes a point of electrical contact between the workpieces themselves in their overlapped location between the electrodes. Welding current is then fed to the electrodes and this current passes through the workpieces. The heat of the electric current welds the pieces together in a spot surrounding the point of electrical contact through the overlapped portions of the workpiece or workpieces.

The electrodes are relatively larger than the point of electrical contact and the spot weld. The equipment supporting each pair of electrodes is relatively very much larger than the point of electrical contact and the spot weld. Thus pairs of electrodes cannot be placed closely together to make closely adjacent spot welds.

Also it is not feasible to make more than one point of electrical contact through a workpiece between a pair of electrodes because one point of contact through the workpiece normally provides the best electrical path and the weld takes place at this spot. Thus it is not commercially practical to make two or more contact projections on the electrodes to make two or more points of electrical contact between the workpieces as their electrical current communicating ability usually will be different and the current will weld properly at the point of best electrical contact while the other points may make partial unsatisfactory welds. This only results in scrap workpieces as the current cannot be positively controlled.

In spot welding, the workpiece usually is deformed slightly. This results from the flow of the metal in the welding and also due to the forced engagement of the welding tips. Adjacent the reduced portions of the workpieces at the spot weld or dimple, there usually appears a somewhat bulging conformation. This is usually apparent although sometimes it is not quite as evident as at other times. However, this situation does exist and at the bulging portion, the workpieces are in spaced relationship relative to one another. This makes it relatively difficult to produce another spot weld between the pieces closely adjacent to a spot weld after the electrodes are withdrawn. Thus in the manufacture of many industrial parts and in various manufacturing processes, spot welding has not been able to be used. Brazing, silver-soldering, and seam welding have been employed to obtain a substantially continuous joining of workpieces together especially where the visual aspect of the product is important, such as in trim moldings which are exposed to view and constitute embellishing aspects.

The welding of a trim molding may be considered as exemplary of the many advantages of the novel welding means and welding process of the invention as trim molding must be smoothly and evenly welded, it must not be burned or have depressed spots and intervening bulges, and it must have a suitable continuous weld to present a substantially continuous surface for subsequent plating as the plating process does not cover up imperfections but rather accentuates them. Also the weld must be firmly made and be preferably continuous so that the welded portion of the trim molding may be ground off in the place of the overlap to present a substantially continuous surface without pits or pock marks.

The means and processes heretofore employed in making such welds are not entirely satisfactory especially commercially as they are complicated, expensive, difficult to use, and time consuming, and uncertain in operation.

With the foregoing in view, the primary object of the invention is to provide means for making closely adjacent spot welds and a process of making closely adjacent spot welds which is simple in operation and construction, inexpensive to use, easy to use, extremely fast in operation, and which is relatively certain in operation.

An object of the invention is to provide means and a process for making series of spot welds in close relationship with the welds overlapped in a continuous seam or spaced as desired.

An object of the invention is to provide means and a process for making closely spaced spot welds wherein they are made in a single operation and have the characteristics of a mashed seam weld.

An object of the invention is to provide moving electrode welding tips in forced engagement with the workpieces wherein the moving welding tips effect a series of electrical contacts through the workpiece which are closely adjacent to one another.

An object of the invention is to supply intermittent welding current to the electrodes as they define the closely spaced points of electrical contact through the workpiece to weld the workpiece at the closely adjacent spots.

An object of the invention is to provide moving electrodes relative to the closely adjacent welded spots to provide compacting action as the closely adjacent spots are welded so as to eliminate the usual incidence of bulging or raised portions.

An object of the invention is to provide an electrode having a curved rocking surface which rocks over the workpiece in a line of electrical point contacts to effect closely adjacent welds in the workpiece in either overlapped or spaced relationship.

An object of the invention is to move the other electrode relative to the rocking electrode so that the workpiece and the electrodes travel at the same rate in the same direction to avoid scuffing or marring the workpieces in the location of the welds.

These and other objects of the invention will become apparent by reference to the following description of the novel means and process of the invention taken in connection with the accompanying drawings in which:

FIG. 4 is an enlarged view of the electrodes of FIG. 1 partly broken away, showing the workpiece and the electrodes at the beginning of their movement.

FIG. 5 is a view similar to FIG. 4 showing the workpiece and the electrodes at the end of their movement; and FIG. 6 is a side elevational view of a motor driven embodiment of the invention.

Figure 1:
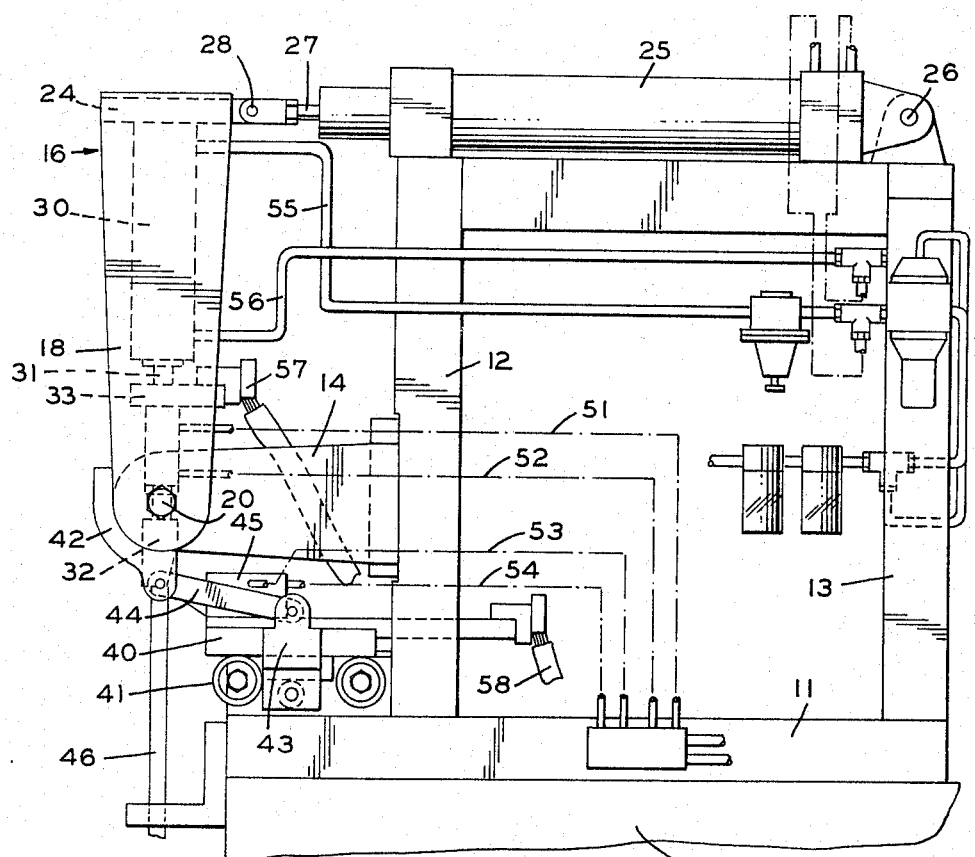
FIG. 1 is a side elevational view of the novel welding means for practicing the novel process.

The novel means and process of the invention includes providing at least one electrode having a curved face. The curved face of the electrode is rocked relative to the other electrode and the workpieces positioned between them. Thus the curved faced electrode rocks across the workpiece defining a plurality of points of electrical contact in a line. This involves travel of the curved faced electrode relative to the workpiece and/or the other electrode. This may be done by moving the head or welding gun supporting the curved faced electrode. This may also be done by moving the workpiece and the other electrode relative to the curved faced electrode. The later movement is disclosed and described herein as illustrative of both.

The electrodes are forced toward each other as the rocking takes place. This forces the electrodes into good electrical contact with the workpiece and also forces the overlapped portions of the workpiece into good electrical contact with each other. The workpiece may be two thicknesses or more of material as desired and any combination of thicknesses may be welded along the line of welding.

As the curved faced electrode rocks across the workpiece in a line of electrical contact points, welding current is intermittently supplied. For example, the workpiece is positioned and the curved faced electrode brought into forced contact with the workpiece at the starting point of rocking motion in a dwell period. Welding current may be supplied at that point spot welding the workpiece. The rocking motion may then be started and the welding current supplied at certain positions or locations such as at every one sixteenth (1/16″) inch of peripheral travel. Accepting as given that the electrodes make a one eighth (1/8″) inch weld each time the welding current is supplied, it will be understood that the welds may be overlapped one sixteenth (1/16″) inch in a continuous seam weld. At the end of rocking motion there may be a dwell period and the welding current supplied in a terminal spot weld. Thus the start and end of the seam weld may be positively accurately welded without gradual lead-in and gradual lead-out.

The size of a spot weld is a function of the thickness of the material of the workpieces, the power of the welding current, the size of the electrodes, the time period in which current is supplied, etc. The foregoing example is for relatively quite thin material. This example is selected as it provides the additional illustrative condition that the seam weld is made without burning up the material thus showing that the novel process and means affords excellent control.

When the spot welds are overlapped the material is relatively plastic and under the forced condition of the electrodes, the line of overlapped spot welds is compressed as it is formed providing a mashed seam weld. This may be done at the edge of an overlap and the overlap reduced to the plane of the substrate piece. This provides a smooth seam weld requiring a minimum of grinding and polishing to make the welded joint look like a continuous piece prior to finishing such as by plating or painting.

Figure 2:
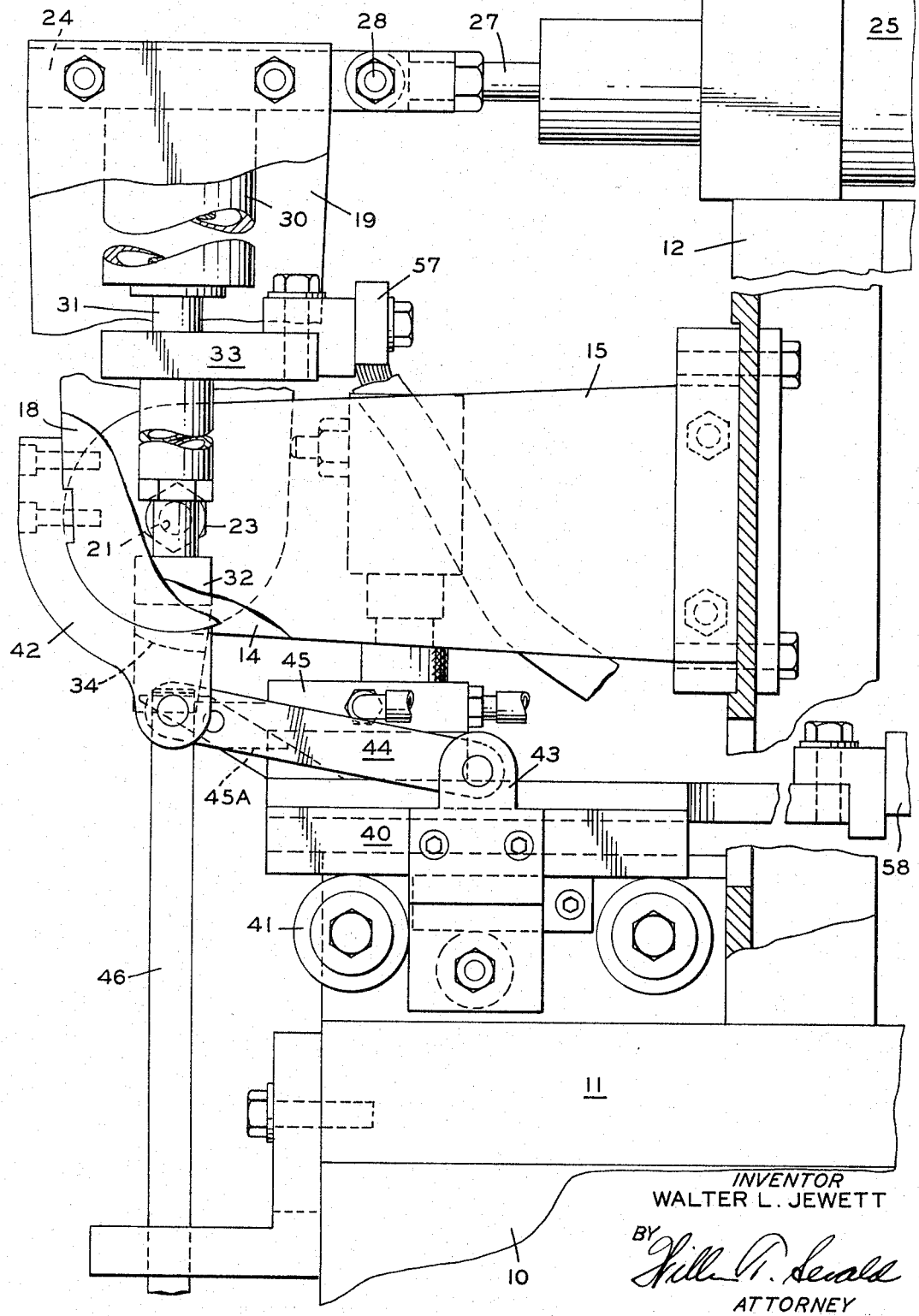
FIG. 2 is an enlarged and fore-shortened view of the moving electrode portion of FIG. 1.
Figure 3:
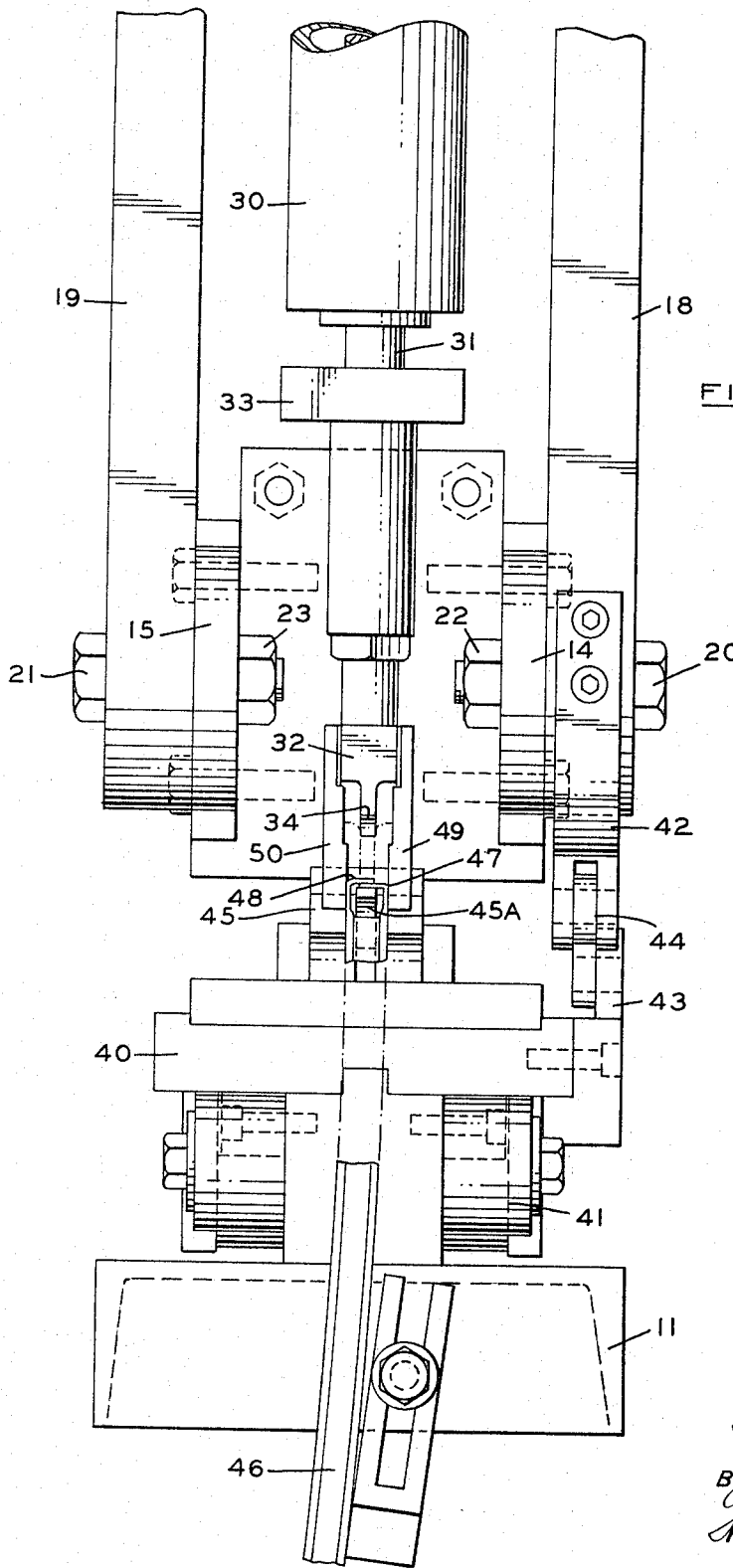
FIG. 3 is an enlarged, partial, end-elevational view of the device seen in FIG. 1 taken from the left hand side thereof.

Obviously the spot welds may be overlapped to any desired extent or spaced apart any desired extent by the coordination between the rocking peripheral travel rate, the welding current time period duration, and the intermittent rate at which current is supplied. These are also coordinated with the thickness of the material, the size of the electrodes, the current power, etc Referring now to the drawings wherein like numerals refer to like and corresponding parts throughout the several views, the welding machine disclosed therein to illustrate the novel means and to disclose the novel process comprises a machine 10 having a table 11, FIGS. 1–5. Frame members 12 and 13 are mounted on the table 11. Paired, spaced, cantilevered arms 14 and 15 are fixed on the frame member 12. The arms 14 and 15 have axially aligned apertures adjacent their outer ends. A head 16 has spaced arms 18 and 19 equipped with axially aligned apertures at their lower ends. The apertures of the head 16 align with the apertures of the arms 14 and 15. A bolt 20 extends through the apertures of the arm 14 and the arm 18 on the head 16 and is secured by a nut 22. A bolt 21 extends through the apertures of the arm 15 and the arm 19 on the head 16 and is secured by a nut 23. The arms 18 and 19 of the head are inter-connected at their upper ends by a web 24. An air cylinder 25 is pivotally mounted on the frame member 13 at 26. The air cylinder actuates a piston rod 27 which is pivotally connected to the web portion 24 of the head 16 at 28. The head 16 carries a welding gun 30 based against the web portion 24. The welding gun 30 has an air cylinder which actuates a piston rod 31. An electrode 32 having a curved welding surface is connected to the piston rod 31 by suitable attaching means 33. A curved face or edge 34 on the electrode 32 extends beyond the pivot point of the bolts 20 and 21. When the air cylinder 25 moves the piston rod 27 outwardly, the head 16 is pivoted moving the curved portion 34 on the other side of the pivot point in a rocking-sweeping motion inwardly toward the machine frame 12.

A slide 40 is movably positioned on the machine 10 such as by rollers 41. A bracket 42 on the arm 18 on the head swings with the arm 18 and the head 16. A boss 43 is secured to the slide 40. A connecting rod 44 is pivotally connected to the boss 43 and to the bracket 42. As the head 16 is moved pivotally, the bracket 42 swings and moves the slide 40 through the connecting rod 44. A mating electrode 45 is mounted on the slide 40 in opposition to the electrode 32. When the cylinder of the welding gun 30 extends the piston rod 31, the electrode 32 moves downwardly and the curved portion 34 thereof is moved into forced engagement with the electrode 45. A workpiece 46 has overlapped edges 47 and 48 to be welded together. The overlapped edges 47 and 48 are disposed over the electrode 45. Thus when the electrode 32 is advanced into forced relationship relative to the electrode 45, the overlapped edges 47 and 48 are compressed between the curved portion 34 of the electrode 32 and the face of the electrode 45. Suitable guides 49 and 50 hold the workpiece in the desired relationship during the welding operation.

Coolant is fed to the electrode 32 by the lines 51 and 52. Coolant is fed to the electrode 45 by the lines 53 and 54. The electrodes are thereby suitably cooled during the welding operation so that the machine may continuously weld parts without overheating. The welding gun 30 is supplied with fluid under pressure by the lines 55 and 56. Similar lines lead to the air cylinder 25. A cable 57 is attached to the electrode 32 and a cable 58 is attached to the electrode 45. The electrode 45 may have a reversible tip 45A in working relationship with the curved face 34 of the electrode 32.

A suitable welding transformer supplies welding current through the cables 57 and 58 to the electrodes 32 and 45. The current is controlled by suitable control devices such as ignition tubes, a pulsation timer, faze shift heat controls, and automatic disconnect means. Suitable air or hydraulic connections are provided for the lines to the cylinder 25 and the welding gun 30. Automatic controls are preferably provided to actuate the machine in the desired sequence in timed relationship. Any type automatic control is suitable for this purpose as is well understood in the automatic control and servomechanism art.

In the sequential operation of the machine of FIGS. 1–5, the operator locates the workpiece 46 with its overlapped edges 47 and 48 on the bottom electrode 45. Suitable work holding elements hold the workpiece in position. The operator then trips the master switch of the machine and fluid pressure is fed to the welding gun 30 extending the electrode 32 into forced engagement against the overlapped edges 47 and 48 of the workpiece 46.

Fluid under pressure is gradually fed to the cylinder 25 gradually extending the piston rod 27 and imparting a gradual pivoting motion to the head 16. This provides a gradual rocking sweeping motion to the electrode 32 curved surface 34 relative to the overlapped edges 47 and 48 of the workpiece while in pressed engagement thereagainst. The connecting rod 44 imparts equal motion to the slide 40 and bottom electrode 45 so that the sweeping action of the rocking electrode 32 and its curved surface 34 is eliminated in the motion. The curved surface 34 of the upper electrode 32, is thereby rocked across the overlapped edges 47 and 48 of the workpiece 46 from the position seen in FIG. 4 to the position seen in FIG. 5.

As this rocking motion occurs, the curved surface 34 presents a series of points of electrical contact between the curved surface 34 and the bottom electrode engaging tip 45 through the overlapped edges 47 and 48 of the workpiece 46. While these contacts may be relatively infinite, the relationship is such that at least a great many points of contact are established in closely spaced relationship.

As the curved surface 34 of the electrode 32 rocks across the overlapped edges 47 and 48 of the workpiece 46, the automatic control means of the machine pulses welding current at spaced time intervals through the electrodes 32 and 45 relative to relative rocking travel so that welding current passes through the overlapped edges 47 and 48 of the workpiece 46 welding them together. The timing of the pulses of welding current are coordinated with the relative movement of the electrodes 32 and 45 so as to weld the overlapped edges 47 and 48 in overlapped spot welds at the contact points defined between the electrode surface 34 and the electrode tip 45A at the time the welding current pulse occurs. This produces a continuously welded relationship between the overlapped edges of the workpiece so that in result the overlapped edges are welded together in a continuous seam weld.

Referring now to the embodiment of FIGS. 5 and 6, a machine 70 has a column 71. The column 71 supports the paired arms 14 and 15. The paired arms 14 and 15 pivotally support the head 16. The welding gun 30 is mounted on the head 16. The gun 30 is equipped with the curved faced electrode 32. The bottom electrode 45 is carried on the slide 40. The slide 40 rides on the rollers 41.

A connecting rod 72 has a first end connected to the head 16 and a second end. A lever 73 is connected to the second end of the rod 72. The lever 73 is pivotally mounted at 74 on the machine 70. The lever 73 has a bottom end 75 extending beyond the pivot point 74. A drag link 76 lies between the bottom end 75 of the lever and the slide 40.

The length of the lever 73 on either side of the pivot point 74 is coordinated to move the head 16 and the curved faced electrode 32 and the slide 40 and the bottom electrode 45 at the same rate. The lever 73 has a cam slot 77. A roller cam 78 rides in the slot 77. A crank 79 swings the cam roller 78. A motor 80 and a reduction gear set 81 drive the crank 79 through a brake 82.

This particular motor drive in conjunction with the cam slot 77, roller cam 78, and crank 79 is suitable to provide a dwell adjacent the points of dead center of the crank 79 relative to the cam slot 77. The dwells may be designed to lie at the start and finish of a mashed seam weld. Thus the first 20 degrees of crank motion may be a squeeze spot weld. The next 160 degrees may be overlapped spot welds in a seam. The last 40 degrees may be a holding spot weld. The total of 220 degrees crank rotation produces forward motion of the lever 73, connecting rod 72, and head 16 due to the angulation of the cam slot 77 and the pivot point 74 location relative to the crank 79. The next 130 degrees of crank rotation produces lever 73 rapid return motion due to the conditions being reversed. Five degrees of angular motion may be used at either end of lever movement to make the total of 360 dgrees.

In operation, the workpiece 46 is positioned on the bottom electrode 45A. The automatic cycle of the machine 70 is then started. The welding gun 30 advances the electrode 32 against the workpiece 46. This presses the workpiece 46 between the electrodes 32 and 45. The motor 80 starts and the lever 73 gradually swings to rock the electrode 32 and move the electrode 45 and the workpiece 46 with the rocking motion of the electrode 32. As the electrode 32 rocks across the workpiece 46, welding current is supplied intermittently.

The starting rate of rocking motion of the electrode 32 is relatively slow due to the crank 79 and roller cam 78 moving adjacent dead center relative to the cam slot 77 in the lever 73. This provides the opportunity to make a squeezing spot weld of relatively longer duration. The welding current also may be supplied for a longer duration at the start. Thus the operation on the workpiece is started with a positive weld and a time period provided to allow the workpiece to be positively welded. This initial welding time period is relatively short in itself but it is longer than the succeeding weld periods. This also provides a period to allow the workpiece to take form and shape under the electrode pressure and heat. Thus it is not necessary to supply extra or more intense heat to start the weld. This eliminates burning the workpiece.

The succeeding rate of rocking motion of the electrode 32 is increased as the crank 79 is now moving between the points of dead center relative to the cam slot 77. During this motion the welding current is supplied intermittently for intervals and may be calculated to make overlapping spot welds as the electrode 32 rocks across the workpiece 46. Thus the welding operation proceeds in a seam weld across the workpiece to the terminal point of the weld.

Adjacent the terminal point of the weld the crank is adjacent its other point of dead center relationship relative to the cam slot 77. This slows down the rocking motion of the electrode 32 adjacent its termination of forward rocking motion. The welding current now may be supplied for shorter time periods and at intervals separated by longer time periods.

At the terminal point of the weld the crank is at its other point of dead center relationship relative to the cam slot 77 and the electrode 32 is relatively stationary. Welding current supplied now finishes the weld in a terminal weld with the stationary position of the electrode holding the workpiece in the desired position.

The welding gun 30 now retracts the electrode 32 and the rapid return of the mechanism now takes place and the machine cycle automatically shuts down. The next workpiece is inserted and the machine recycled.

The novel welding machine is positive in cycle time and weld distance. This permits accurate calculation of potential machine production and this is an advantage in determining machine tooling and production output.

While only a single set of electrodes has been shown and described to made one seam weld or a series of spot welds in a workpiece, it is to be understood that a machine may have multiple sets of electrodes operating in a line so that they make interconnected welds in a workpiece resulting a long continuous or substantially continuous weld.

The weld workpiece may be treated and desired. The treating may include flash chrome plating after the workpiece has been ground and polished with the plated workpiece at the weld presenting the aspect of a continuous strip of material. Thus the invention welds the workpiece in closely adjacent spot welds or in overlapped spot welds so that the welded portion of the workpiece is seam welded.

The novel process and means for welding with the features described provides a quick, simple, inexpensive, high production way to weld workpieces together at closely adjacent spot welds or in a continuous seam between a pair or pairs of electrodes in one simple operation.

Although but two embodiments of the invention have been disclosed and described in detail, it is obvious that various and many changes may be made in the size, shape, detail, and arrangement of the various elements

I claim:

1. A welding machine for welding a workpiece in a series of welds in one operation with the welds overlapped or spaced as desired, comprising:
   a machine frame;
   a head pivotally mounted on said frame for rocking motion;
   means on said frame for rocking said head;
   a welding gun mounted on said head;
   an electrode welding tip on said gun having a curved workpiece contacting portion;
   a slide;
   means movably mounting said slide;
   a link inter-connected between said slide and said head for transferring the motion of said head to said slide;
   a mating electrode on said slide;
   means intermittently feeding a welding current to said electrodes during their movement;
   a workpiece being positionable between said electrodes;
   said welding gun advancing said curved electrode toward said mating electrode to engage the workpiece therebetween in forced contact;
   said head moving said curved electrode in a rolling motion over the workpiece defining a plurality of contact points between said electrodes through the workpiece with said link moving said slide and the workpiece in conjunction with the rolling motion of said curved electrode;
   said means for intermittently feeding welding current to said electrodes supplying welding current pulses to said electrodes as the line of contact points are defined through a workpiece to weld the workpiece in a series of welds.

2. A welding machine for welding a workpiece in a series of welds in one operation with the welds overlapped or spaced as desired comprising:
   a first electrode having a curved profile for contacting a workpiece;
   a second electrode mating with said first electrode;
   a rocking head supporting one said electrode;
   a movable slide supporting the other said electrode;
   means coordinating the motion of said head and slide to move said electrodes at the same relative rate in the same direction to rock at least one said electrode relative to the other with said curved profile electrode and said mating electrode defining a series of contact points between themselves and through a workpiece interposed between them;
   means for advancing one said electrode toward the other to forcibly engage a workpiece lying between them;
   means for moving at least one said head and said slide to rock said head and move said slide to roll at least one said electrode relative to the workpiece; and
   means for intermittently supplying welding current to said electrodes while they are defining a series of contact points through the workpiece to weld the workpiece in a series of spot welds at the contact points in the series at the times when welding current is supplied.

3. A welding process for welding a workpiece in a series of welds between two electrodes in one operation comprising:
   locating a workpiece between two electrodes with at least one electrode having a curved welding surface;
   bringing the electrodes into forced engagement with the workpiece, and simultaneously
   moving said electrodes and said workpiece so that said electrode having the curved surface rocks relative to said other electrode and the workpiece defining a series of electrical contact points along the line of rocking between the rocking curved electrode and the other electrode through the workpiece; and
   intermittently feeding welding current to said electrodes while they are defining a series of contact points through the workpiece to weld the workpiece in welds at the contact points in the series at the times when the welding current is fed.

4. A welding machine for welding a workpiece in a series of welds in one operation, comprising:
   a machine frame;
   a head pivotally mounted on said frame for rocking motion;
   a welding gun mounted on said head;
   an electrode welding tip on said gun having a curved workpiece contacting portion;
   a lever on said frame for rocking said head;
   a slide;
   means movably mounting said slide;
   a link inter-connected between said slide and said means for transferring the motion to said slide when said means rocks said head;
   a mating electrode on said slide;
   means intermittently feeding a welding current to said electrodes during their movement;
   a workpiece being positionable between said electrodes;
   said welding gun advancing said curved electrode toward said mating electrode to engage the workpiece therebetween in forced contact;
   said head moving said curved electrode in a rolling motion over the workpiece defining a plurality of contact points between said electrodes through the workpiece with said link moving said slide and the workpiece in conjunction with the rolling motion of said curved electrode;
   said means for intermittently feeding welding current to said electrodes supplying welding current pulses to said electrodes as the line of contact points is defined through a workpiece to weld the workpiece in series of welds.

References Cited

UNITED STATES PATENTS

| 2,957,976 | 10/1960 | Green | 219—81 |
| 3,102,945 | 9/1963 | Opprecht | 219—81 |
| 3,175,071 | 3/1965 | Fisher | 219—81 |
| 3,125,668 | 3/1964 | Eisenburger | 219—87 |
| 3,163,742 | 12/1964 | Rohr et al. | 219—82 |
| 3,235,704 | 2/1966 | Rockwell | 219—86 |
| 3,250,890 | 5/1966 | Denis et al. | 219—89 |
| 3,308,262 | 3/1967 | Fisher et al. | 219—86 |

RICHARD M. WOOD, *Primary Examiner.*

W. D. BROOKS, *Assistant Examiner.*